R. BRIDGE AND E. BRADSHAW.
FRICTION CLUTCH.
APPLICATION FILED MAR. 31, 1917.
1,312,776.
Patented Aug. 12, 1919.
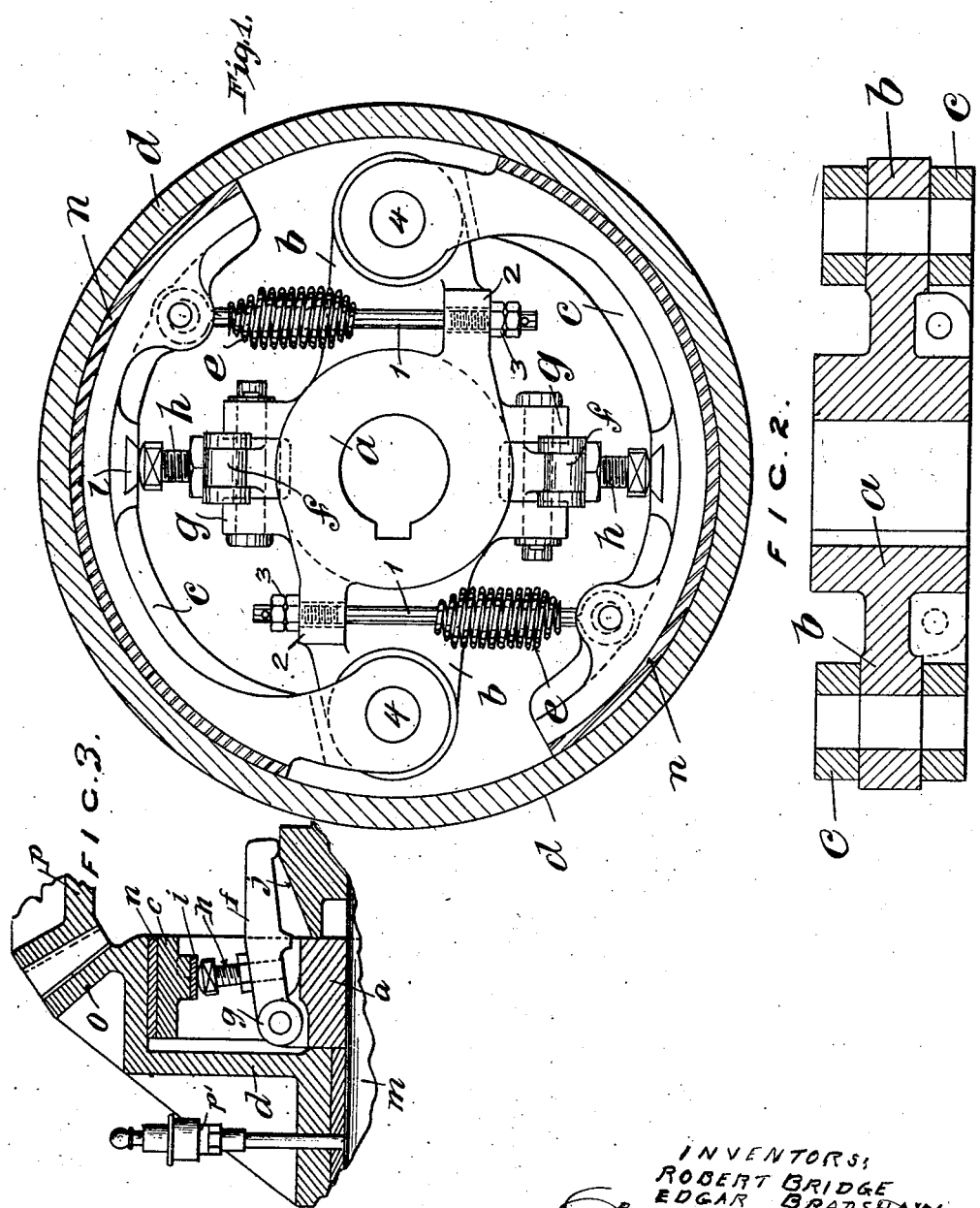
INVENTORS:
ROBERT BRIDGE
EDGAR BRADSHAW

UNITED STATES PATENT OFFICE.

ROBERT BRIDGE AND EDGAR BRADSHAW, OF CASTLETON, ENGLAND, ASSIGNORS TO DAVID BRIDGE AND COMPANY, LIMITED, OF CASTLETON, ENGLAND.

FRICTION-CLUTCH.

1,312,776.          Specification of Letters Patent.          Patented Aug. 12, 1919.

Application filed March 31, 1917. Serial No. 158,818.

*To all whom it may concern:*

Be it known that we, ROBERT BRIDGE and EDGAR BRADSHAW, subjects of the King of Great Britain and Ireland, residing at Castleton Ironworks, Castleton, in the county of Lancaster, England, have invented new and useful Improvements in Friction-Clutches, of which the following is a specification.

The invention relates to friction clutches of the type comprising an outer shell, driven by or driving an inner clutch half of the expansible type and is illustrated in the accompanying drawings, in which, Figure 1 is a face view of the friction clutch.

Fig. 2 is a detail sectional view illustrating the construction of the arms of the internal half of the clutch.

Fig. 3 is a sectional view through one half of the clutch illustrating the construction for actuating the shoes in the outward movement thereof.

In our invention the inner clutch half consists of a boss $a$ having arms $b$ to which are hinged two or more segments $c$ which are thrust into engagement with the outer shell $d$ and form the driving connection between the inner clutch half and the outer shell. Normally, coiled springs $e$ or the like maintain the expansible clutch half free of the outer shell. The springs $e$ which are connected at their outer ends with the shoes are each located at one side of one of the arms $b$ and each spring is connected at its inner end with a rod 1 extending across the arm $b$ to the opposite side or edge thereof from that at which the spring $e$ is arranged and it passes through a lug 2 and is provided with adjusting means preferably consisting of nuts 3 which are located at the outer edge of the lug 2. The rod 1 is arranged between the pivot 4 of the shoe $c$ and the shaft on which the clutch is mounted and the spring and the adjusting means of the rod 1 for tensioning the spring are arranged at opposite sides of the arm $b$ for facilitating the adjustment of the spring. To obtain the necessary expansion of the internal segments or the like we provide pawls $f$ hinged to snugs $g$ formed on the boss $a$, carrying adjustable studs $h$ having a rounded head disposed in contact with a steel pad or block $i$ secured to the expansible segment $c$. A roller or ball may be used in place of the round headed stud. These pawls rest on or are in juxta-position with an inclined surface $j$ forward on a sleeve $k$ slidable on the shaft $m$ by the usual or convenient striking gear. When this sleeve $k$ is thrust inward on the shaft toward the clutch, the pawls $f$ ride up the inclined surface $j$ and the studs carried thereby thrust the expansible segments $c$, or ring, into contact with the outer shell $d$ against the action of the springs $e$ and driving connection is thereby obtained. When the sleeve $k$ is moved away, the springs insure the disengagement of the clutch halves. The segments $c$ or expansible ring may be provided with a contact surface $n$ of suitable material. The arrangement described provides for easy and rapid engagement without shock or jar.

We declare that what we claim is:—

In combination, a shaft, a pulley loosely mounted on the shaft, a pair of diametrically opposed arms fixed to said shaft and provided intermediate of their ends with lugs, shoes pivotally mounted on said arms for engagement with the inner periphery of the pulley, springs located at opposite sides of the shaft and connected at their outer ends with the shoes, rods extending across the arms between the said shaft and the pivotal points of the shoes and passing through the said lugs and connected with the springs and provided at the outer sides of the said lugs with adjusting means for tensioning the springs, said springs and the adjusting means being located at opposite sides of the arms, and means for actuating the shoes for forcing the same outward into engagement with the pulley.

In testimony whereof we have signed our names to this specification in the presence of two subscribing witnesses.

ROBERT BRIDGE.
                EDGAR BRADSHAW.

Witnesses:
    JOSHUA ENTWISLE,
    ALFRED STUART YATES.